Patented June 23, 1942

2,287,597

UNITED STATES PATENT OFFICE 2,287,597

MANUFACTURE OF MELAMINE

Alfred Brookes, London, England, assignor, by mesne assignments, to American Cyanamid Company, New York, N. Y., a corporation of Maine No Drawing. Application May 11, 1940, Serial No. 334,655. In Great Britain May 11, 1939

11 Claims. (Cl. 260—248)

This invention relates to a process for the manufacture of melamine.

According to this invention melamine is prepared by the fusion of cyanamide and/or dicyandiamide in the presence of a salt or mixture of salts of guanidine, biguanide or the derivatives thereof, the guanidine radicle of which is not decomposed during fusion.

Examples of suitable salts are guanidine hydrochloride guanidine sulphate, guanidine thiocyanate, biguanide hydrochloride, biguanide nitrate, salts of alkyl, aryl and mixed alkyl-aryl guanidines or biguanides, for example methyl guanidine hydrochloride, dimethyl diguanide hydrochloride, and the hydrochlorides of mono-, di- and tri-phenyl guanidine.

The salts of guanidine, biguanide or their derivatives are recovered from the final fusion product and utilised again in further fusions.

The salts may be formed in situ, for example, by the heating of cyanamide or dicyandiamide with the ammonium salt of the appropriate acid or with a substance such as thiourea, which on heating gives rise to an ammonium salt. In the production of the alkyl or aryl or mixed alkyl-aryl salts the appropriate substituted ammonium salts are employed. Thus, when the salts are produced in this manner, further quantities of cyanamide or dicyandiamide are added to give the desired yield of melamine. The melamine is separated from the remaining salt which may be used again in the process.

Preferably the reaction for the production of the melamine is arranged to take place between 150° C. and 250° C., and may if desired be effected under elevated pressure.

It is known that guanidine salts may be decomposed by heat to form melam and other insoluble substances in which case small quantities of melamine may be formed and escape final decomposition, but it is a feature of this invention that decomposition of the guanidine radicle is avoided by the use of salts which are themselves stable in fusion, or give rise to salts that remain relatively stable, and by the avoidance during fusion of temperatures conducive to instability and decomposition. By these novel means, cyanamide or dicyandiamide is polymerised independently in excellent yield to melamine and the salts originally used, or made during fusion, are recovered in good yield for subsequent reworking.

The following are examples of carrying out the invention:

Example 1

An intimate mixture of 84 parts dicyandiamide, 54 parts ammonium chloride is melted in a fusion pot by heating in an oil bath maintained at 180° C. The mixture melts at about 155° C. and after about ten minutes an exothermic reaction sets in, the melt rising to about 220° C. When this reaction has subsided, i. e., when the temperature has fallen to about 200° C., a further 42 parts dicyandiamide is added and dissolved by stirring. The melt is maintained for 4–5 hours at about 180° C. until it solidifies. It is then broken up and extracted with water. The product comprising about 98% yield of the reagents contains about 76 parts melamine, 92 parts guanidine hydrochloride and 8–9 parts insoluble or slightly soluble material (melam, mellem, etc.).

Example 2

63 parts dicyandiamide and 27 parts ammonium chloride are cautiously melted at about 163° C. After the exothermic reaction has subsided the melt is fused for about 3 hours at 180–190° C. when it has appreciably thickened in consistency. A further 63 parts of dicyandiamide are added in portions at intervals and after the last addition the melt is maintained for about 4 hours at 180–190° C. until it solidifies. A yield of 98% is obtained, the product comprising 86 parts melamine, 46–47 parts guanidine hydrochloride and about 18 parts slightly soluble materials.

Example 3

The final fusion product obtained according to either of the preceding examples is leached with cold water and the solution evaporated to dryness. 48 parts of the guanidine hydrochloride so obtained is fused with 63 parts dicyandiamide for 4–5 hours at about 180° C. until the melt has solidified. The product, comprising 99% yield of the reagents, consists of about 60 parts of melamine, 7 parts of insoluble or slightly soluble materials and 44 parts of guanidine hydrochloride.

Example 4

A mixture of 38 parts thiourea and 42 parts dicyandiamide is fused at 160° C. and a further 42 parts dicyandiamide are fed in. The melt is maintained for about 3 hours at 180°–190° C. until it has appreciably thickened in consistency. A yield of 98–99% is obtained, the product comprising about 55 parts guanidine sulphocyanide, 45 parts melamine and 20 parts insoluble or slightly soluble materials, The product is cooled, broken up, leached with cold water for extraction of the guanidine salt, and the solution evaporated to dryness. 50 parts of the recovered guanidine sulphocyanide are fused with 50 parts dicyandiamide for about 6 hours at 160–180° C. yielding a product comprising about 48 parts guanidine sulphocyanide, 38 parts melamine, and 12 parts insoluble or slightly soluble materials.

*Example 5*

A mixture of 41 parts dimethylamine hydrochloride and 84 parts dicyandiamide is fused at about 80° C. and the melt is then heated for about 12 hours at 160–170° C. The product comprises about 41 parts melamine and 6 parts insoluble or slightly soluble materials together with 74 parts readily soluble salts, mainly dimethylguanidine hydrochloride.

*Example 6*

A mixture of 25 parts triphenylguanidine hydrochloride and 50 parts dicyandiamide is melted in an open pot at 160°–170° C. and during fusion a further 50 parts dicyandiamide are fed in. The melt is then further heated for about 2 hours at 180° C. rising to 220° C. until it solidifies. The product comprises about 40 parts melamine and 40 parts insoluble or slightly soluble materials, together with 40 parts guanidine salts readily soluble in water.

25 parts of the mixture of guanidine and phenyl-substituted guanidine hydrochlorides, obtained by extraction of the above product with water and evaporation of the solution to dryness, are fused at 170° C. with 30 parts dicyandiamide and a further 10 parts of dicyandiamide are added. The melt is then heated a further 3 hours at about 190° C. until it solidifies. The product comprises about 32 parts melamine, 12 parts insoluble or slightly soluble materials and 20 parts guanidine salts which may be extracted and used in a further fusion with fresh dicyandiamide.

It will be seen from the above that the temperature of heating the mixtures may be varied but is so selected and controlled that the desired reaction for the formation of high yields of melamine is obtained without substantial decomposition of the guanidine salts used and that the salts used are thus relatively stable to the temperatures employed for the length of the reaction period, and can be largely recovered from the reaction mass.

What I claim is:

1. Process for the manufacture of melamine by polymerizing thereto by fusing at least one substance selected from the group consisting of cyanamide and dicyandiamide in the presence of at least one substance selected from the group consisting of the salts of guanidine, biguanide and derivatives thereof, the guanidine radicle of which is not decomposed during fusion under such conditions of time and temperature control that the salt is little decomposed to the extent of guanidine radicle being disrupted with loss of ammonia so that the salt remains and is recoverable for use in polymerizing further cyanamide or dicyandiamide.

2. Process for the manufacture of melamine by polymerizing thereto by fusing at a temperature in the reaction mass of between 150 and 250° C. at least one substance selected from the group consisting of cyanamide and dicyandiamide in the presence of at least one substance selected from the group consisting of the salts of guanidine, biguanide and derivatives thereof, the guanidine radicle of which is not decomposed during the fusion under such conditions of time and temperature control that the salt is little decomposed to the extent of guanidine radicle being disrupted with loss of ammonia so that the salt remains and is recoverable for use in polymerizing further cyanamide or dicyandiamide.

3. Process as claimed in claim 2, in which the salt component is produced in situ by heating at least one substance selected from the group consisting of cyanamide and dicyandiamide with at least one substance selected from the group consisting of ammonium salts, substituted ammonium salts, and substances which on heating yield ammonium salts.

4. Process as claimed in claim 2, in which the salt component is recovered from the final fusion product and utilised again in a new fashion.

5. Process as set forth in claim 1, in which the amount of salt is less than one molecular equivalent as compared with the substance selected from the group consisting of cyanamide and dicyandiamide.

6. Process for the manufacture of melamine which consists in fusing at least one substance selected from the group consisting of cyanamide and dicyandiamide in the presence of a salt containing the guanidine radicle and in which the guanidine radicle is not decomposed during the fusion, the first named substance being added portionwise during the fusion.

7. Process for the manufacture of melamine which consists in fusing a salt containing the guanidine radicle and in which the guanidine radicle is not decomposed during the fusion with an amount of a substance selected from the group consisting of cyanamide and dicyandiamide insufficient to give substantial yields of melamine under the conditions of fusion, adding further quantities of said last named substance and continuing the fusion at a temperature below that of decomposition of the guanidine salt to give substantial yields of melamine.

8. Process as claimed in claim 1 in which the first named substance is added portionwise during the fusion.

9. Process as claimed in claim 6 in which the salt component is produced in situ by heating at least one substance selected from the group consisting of cyanamide and dicyandiamide with at least one substance selected from the group consisting of ammonium salts, substituted ammonium salts, and substances which on heating yield ammonium salts.

10. Process as claimed in claim 6 in which the product of fushion is leached with water, the lixiviate is dried, and fused with a substance selected from the group consisting of cyanamide and dicyandiamide to form melamine.

11. A process for obtaining high yields of melamine which comprises fusing at least one substance selected from the group consisting of cyanamid and dicyandiamid in the presence of at least one substance selected from the group of salts of guanidine, biguanidine and derivatives thereof stable at a temperature of at least 250° C.; maintaining the fusion temperature in the reaction mass above 150° C. but below the temperature of substantial decomposition of the salt used, and separating the formed melamine from the salt used whereby the latter may be reused.

ALFRED BROOKES.